(12) United States Patent
Morgulis et al.

(10) Patent No.: US 6,840,716 B2
(45) Date of Patent: Jan. 11, 2005

(54) CUTTING TOOL AND CUTTING INSERT THEREFOR

(75) Inventors: Rafael Morgulis, Karmiel (IL); Anton Babushkin, Nahariya (IL)

(73) Assignee: Iscar, Ltd., Tefen (IL)

( * ) Notice: Subject to any disclaimer, the term of this patent is extended or adjusted under 35 U.S.C. 154(b) by 178 days.

(21) Appl. No.: 10/189,011

(22) Filed: Jul. 5, 2002

(65) Prior Publication Data

US 2003/0017014 A1 Jan. 23, 2003

(30) Foreign Application Priority Data

Jul. 5, 2001 (IL) ................................................. 144154

(51) Int. Cl.⁷ .............................. B26D 1/12; B23C 5/00
(52) U.S. Cl. ........................................ 407/34; 407/133
(58) Field of Search ............................ 407/34, 40, 42, 407/47, 48, 113, 103, 39

(56) References Cited

U.S. PATENT DOCUMENTS

| | | | | |
|---|---|---|---|---|
| 1,938,717 A | * | 12/1933 | Oxford | 407/79 |
| 2,134,140 A | * | 10/1938 | Miller | 407/45 |
| 3,188,717 A | * | 6/1965 | Heinlein | 407/40 |
| 3,484,919 A | * | 12/1969 | Stier | 407/77 |
| 3,701,187 A | * | 10/1972 | Erkfritz | 407/48 |
| 5,209,611 A | * | 5/1993 | Drescher | 407/48 |
| 5,542,795 A | | 8/1996 | Mitchell | |
| 5,820,310 A | * | 10/1998 | Boianjiu | 407/66 |
| 5,893,683 A | | 4/1999 | Johnson | 407/42 |
| 5,924,826 A | * | 7/1999 | Bystrom et al. | 407/103 |
| 5,944,456 A | | 8/1999 | Shirley et al. | 407/42 |
| 6,146,061 A | * | 11/2000 | Larsson | 407/103 |
| 6,196,770 B1 | * | 3/2001 | Astrom et al. | 407/40 |

FOREIGN PATENT DOCUMENTS

JP          7-299633          11/1995

* cited by examiner

*Primary Examiner*—A. L. Wellington
*Assistant Examiner*—Dana Ross
(74) *Attorney, Agent, or Firm*—Womble Carlyle

(57) ABSTRACT

A cutting tool has an insert holder provided with an insert receiving pocket and at least one cutting insert mounted therein. The insert receiving pocket has a longitudinally extending inner wall, a rear wall adjacent the inner wall and a lower wall adjacent the inner wall and the rear wall. A front end of the lower wall protrudes forwardly with respect to a central portion of the insert holder. A front protrusion rises upwardly from the lower wall and extends inwardly and rearwardly from a periphery of the insert holder. The front protrusion has a front surface perpendicular to the lower wall. A groove formed in the bottom surface of the cutting insert has a distal side wall perpendicular to the bottom surface. When assembled, a radial abutment surface of the cutting insert abuts a radial abutment surface of the insert receiving pocket, the front surface of the front protrusion abuts the front distal side wall of the groove and a rear portion of the one cutting insert is spaced from the rear wall of the insert receiving pocket.

40 Claims, 6 Drawing Sheets

CUTTING TOOL AND CUTTING INSERT THEREFOR

FIELD OF THE INVENTION

The present invention relates to a cutting tool and a cutting insert therefor for use particularly in ramp-down operations.

BACKGROUND OF THE INVENTION

Cutting tools for performing ramp-down operations are known. Such cutting tools are, usually, end mills and face mills. In these cutting tools, at least one cutting insert is mounted and retained within an insert receiving pocket located in a front portion of an insert holder. During a cutting operation, when a side cutting edge is operative, the radial cutting forces acting on the cutting insert are directed generally radially inwardly thereby urging the cutting insert against a radial abutment surface. Thus, the cutting forces contribute to securing the cutting insert within the insert receiving pocket. Similarly, when a front cutting edge is operative, the axial cutting forces acting on the cutting insert are directed generally axially rearwardly thereby urging the cutting insert against an axial abutment surface. Also in this case, the cutting forces contribute to securing the cutting insert within the insert receiving pocket.

When performing ramp-down operations, the cutting insert utilizes an inner cutting edge that is subjected to axially rearwardly and radially outwardly cutting forces. The radially outwardly directed cutting forces tend to push the cutting insert out of the pocket thereby limiting the feed and the depth of cut of the cutting insert.

For improving the retention of the cutting insert in the insert holder, there are known cutting tools having protrusions interconnected with grooves between the cutting insert's lower surface and the base surface of the cutting insert receiving pocket. An example of such a cutting tool is shown in U.S. Pat. No. 5,542,795 to Mitchell.

In '795 there is disclosed a milling cutter capable of plunge, ramp, and face milling operations. The milling cutter has a cutter body 12 having insert seats 26. Each insert seat 26 includes a bottom wall 28, a side shoulder 30 and a top shoulder 31. The bottom wall 28 of each seat 26 includes a longitudinally oriented slot or recess 32 for receiving a complementary-shaped rail 50 that protrudes from the back surface of each of the inserts 36 and is oriented along a longitudinal axis 50a. The slot and rail constituting means for improved lateral and rotational support for the cutting insert 36. When the cutting insert is secured in the insert seat by means of the locking screw 53, the locking screw presses the cutting insert downwardly and inwardly against the bottom 28 and the sidewall 30 of the insert seat and properly aligns the insert 36 within the seat 26.

The milling cutter of '795 has a number of disadvantages. First, it is understood that in order to enable the insertion of the rail 50 into the groove 32, the groove should be somewhat wider than the width of the rail. Second, in order to enable and ensure that the sidewall 41a of the insert abuts the sidewall 30 of the insert seat, the sidewall of the rail 50 should be spaced from the sidewall of the groove 32. Any production of the insert and the insert seat in tight tolerances is expensive and time consuming.

When the cutting insert in '795 is subjected to radially outwardly directed cutting forces during a ramp-down cutting operation, the rail and groove configuration cannot prevent the bending moment applied on the locking screw 53 due to the fact that the line of action of radially outwardly directed cutting forces acting on the operative cutting edge in the ramp down direction is relatively distanced from the abutting surface that resists those forces, namely, the rear portion of the groove 32 that is behind the locking screw 53. Thus, even though the rail 50 assists in retaining the cutting insert 36, it cannot prevent a slight radially outwardly movement of the cutting insert as a result of small bending of the locking screw when the cutting insert is subjected to large radially outwardly directed forces.

It is an object of the present invention to provide a cutting tool that significantly reduces or overcomes the aforementioned disadvantages.

SUMMARY OF THE INVENTION

In accordance with the present invention there is provided a cutting tool, having an axis of rotation (A), comprising an insert holder and at least one cutting insert mounted therein in a respective insert receiving pocket formed in a front portion of the insert holder;

the insert receiving pocket comprising a longitudinally extending inner wall substantially co-directional with the axis of rotation (A) of the cutting tool, at least a portion of the inner wall constitutes a radial abutment surface of the insert receiving pocket, a rear wall adjacent the inner wall and substantially perpendicular thereto, a lower wall adjacent the inner wall and the rear wall and substantially perpendicular thereto, a front end of the lower wall protruding forwardly with respect to a central portion of the insert holder adjacent the axis of rotation (A) of the cutting tool, a threaded bore extending downwardly from the lower wall, A rear protrusion rising upwardly from the lower wall and a front protrusion rising upwardly from the lower wall and extending inwardly and rearwardly from a periphery of the insert holder, the front protrusion has a front surface perpendicular to the lower wall of the insert receiving pocket, a rear surface and a top surface connecting between the front surface and the rear surface;

the at least one cutting insert comprises an insert top surface, a bottom surface and a side surface extending between the insert top surface and the bottom surface, a central through bore having an axis extending between the insert top surface and the bottom surface, two holder engaging grooves formed in the bottom surface, each holder engaging groove having a distal side wall distal from the axis of the through bore and perpendicular to the bottom surface, a proximal side wall proximal to the axis of the through bore a groove top surface connecting between the distal side wall and the proximal side wall;

in an assembled position of the at least one cutting insert within the respective insert receiving pocket the at least one cutting insert is retained by a clamping screw that passes through the through bore and threadingly engages the threaded bore, the bottom surface of the at least one cutting insert abuts the lower wall of the insert receiving pocket, a radial abutment surface formed in the side surface of the at least one cutting insert adjacent the wall of the insert receiving pocket abuts the radial abutment surface of the insert receiving pocket, the front surface of the front protrusion abuts the front distal side wall of one of the holder engaging grooves and a rear portion of the at least one cutting insert is spaced from the rear wall of the insert receiving pocket.

Preferably, the front protrusion is integrally formed with the lower wall of the insert receiving pocket.

Typically, the front protrusion terminates adjacent the threaded bore.

Further typically, a forward inner end of the lower wall extends inwardly rearwardly from the front end towards the central portion at an acute second angle (θ) with respect to the axis of rotation (A), the second angle (θ) being in the range of 20° to 60°.

According to a specific embodiment of the present invention, the second angle (θ) is 45°.

Typically, the front protrusion extends inwardly and rearwardly from the periphery of the insert holder at an acute third angle (δ) with respect to the forward inner end of the lower wall, the third angle (δ) being in the range of 0° to 20°.

According to a specific embodiment of the present invention, the third angle (δ) is 15°.

Typically, the front protrusion extends inwardly and rearwardly from the periphery of the insert holder at an acute combined fourth angle (λ) with respect to the axis of rotation (A), the fourth angle (λ) being in the range of 20° to 80°.

According to a specific embodiment of the present invention, the fourth angle (λ) is 60°.

If desired, the rear surface of the front protrusion forms an external obtuse fifth angle (β) with an adjacent portion of the lower wall of the insert receiving pocket.

Preferably, the insert receiving pocket is provided with a rear protrusion extending parallel to the front protrusion.

Generally, the rear protrusion has a front surface substantially perpendicular to the lower wall of the insert receiving pocket, a rear surface substantially perpendicular to the lower wall of the insert receiving pocket, and a top surface connecting between the front and rear surfaces of the rear protrusion and substantially parallel to the lower wall of the insert receiving pocket.

Preferably, the front protrusion and the rear protrusion rise evenly upwardly from the lower wall of the insert receiving pocket.

Typically, an upper portion of the inner wall of the insert receiving pocket is flat and constitutes the radial abutment surface.

Generally, an intersection between the top surface and the side surface of the at least one cutting insert defines cutting edges, each of the cutting edges is continuously connected to adjacent cutting edges.

Advantageously, each of the cutting edges is associated with a rake surface, the rake surfaces are positive and extend continuously all around the periphery of the top surface.

Typically, the through bore is perpendicular to the top surface and the bottom surface of the at least one cutting insert.

Preferably, the at least one cutting insert has a 180° rotational symmetry about the axis of the through bore.

Typically, in a top view the at least one cutting insert has a generally parallelogrammatical shape defining a pair of long cutting edges, a pair of short cutting edges, transversely directed to and extending from the long cutting edges, and a pair of rounded cutting edges, each of the rounded cutting edges extends between a long cutting edge and a short cutting edge.

Preferably, the bottom surface of the at least one cutting insert is provided with two identical parallel grooves symmetrically disposed with respect to the axis of the through bore.

If desired, the proximal side wall of a groove is slanted at an internal obtuse ninth angle (γ) with respect to the bottom surface of the at least one cutting insert.

Further in accordance with the present invention there is provided a cutting insert comprising an insert top surface, a bottom surface and a side surface extending between the top and bottom surfaces, a central through bore having an axis extending between the top surface and the bottom surface, the bottom surface being provided with two identical parallel holder engaging grooves located on opposite sides of the through bore, the holder engaging grooves being oriented transversely with respect to a longitudinal axis (B) of the cutting insert, each of the two holder engaging grooves has a distal side wall distal from the axis of the through bore and perpendicular to the bottom surface of the at least one cutting insert, a proximal side wall proximal to the axis of the through bore and a groove top surface connecting between the distal side wall and the proximal side wall.

If desired, each of the proximal side walls is slanted at an internal obtuse ninth angle (γ) with respect to the bottom surface of the cutting insert.

Generally, an intersection between the top surface and the side surface of the cutting insert defines cutting edges, each of the cutting edges is continuously connected to adjacent cutting edges.

Advantageously, each of the cutting edges is associated with a rake surface, the rake surfaces are positive and extend continuously all around the periphery of the top surface.

Typically, the through bore is perpendicular to the top surface and the bottom surface of the cutting insert.

Preferably, the cutting insert has a 180° rotational symmetry about the axis of the through bore.

Typically, in a top view the cutting insert has a generally parallelogrammatical shape defining a pair of long cutting edges, a pair of short cutting edges, transversely directed to and extending from the long cutting edges, and a pair of rounded cutting edges, each of the rounded cutting edges extends between a long cutting edge and a short cutting edge.

Further typically, the short cutting edges are slanted at an acute sixth angle (θ1) with respect to the longitudinal axis (B) of the cutting insert, the sixth angle (θ1) being in the range of 20° to 60°.

According to a specific embodiment of the present invention, the sixth angle (θ1) is 45°.

Typically, the grooves are slanted at an acute seventh angle (δ1) with respect to the short cutting edges, the seventh angle (δ1) being in the range of 0° to 20°.

According to a specific embodiment of the present invention, the seventh angle (δ1) is 15°.

Typically, the grooves are slanted at an acute combined eighth angle (λ1) with respect to the longitudinal axis (B) of the cutting insert, the eighth angle (λ1) being in the range of 20° to 80°.

According to a specific embodiment of the present invention, the eighth angle (λ1) is 60°.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
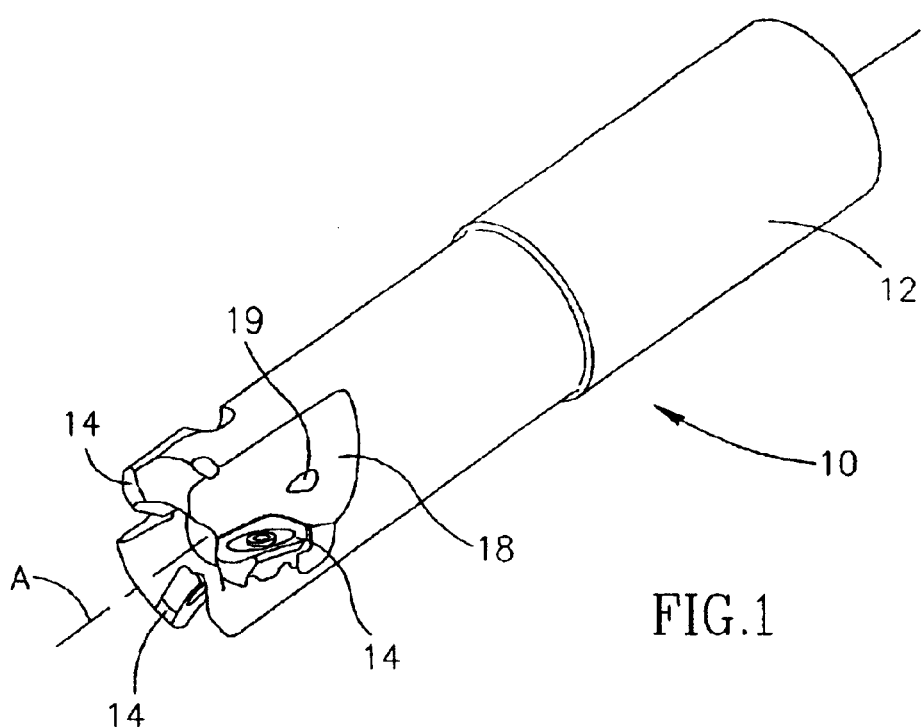
FIG. 1 is a perspective view of a cutting tool according to the present invention.
Figure 2:
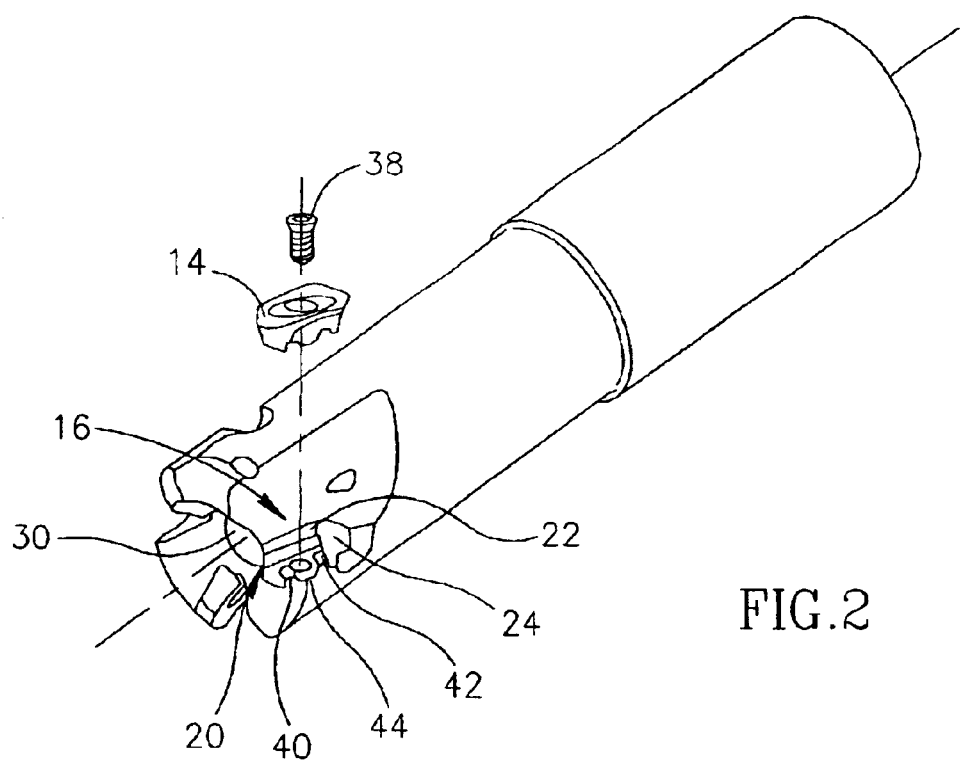
FIG. 2 is a perspective view of the cutting tool of FIG. 1 with one cutting insert shown in an exploded view.
Figure 3:
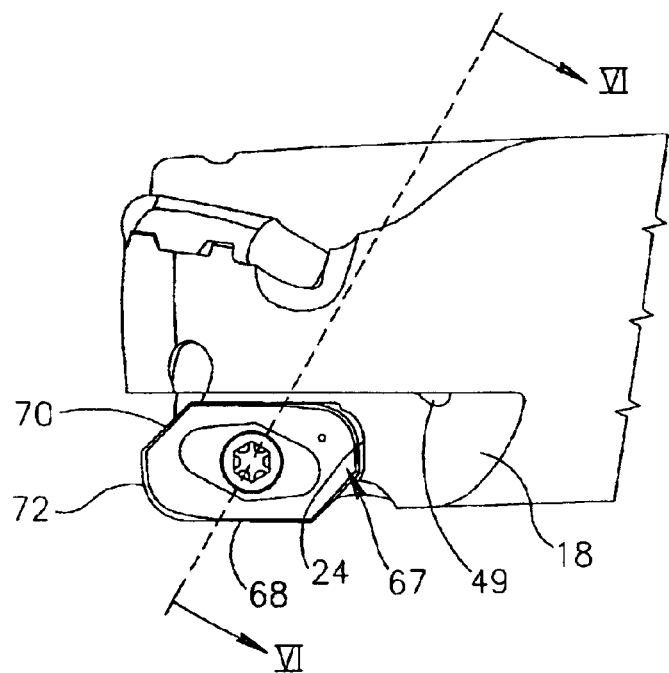
FIG. 3 is a top view of a front portion of the cutting tool of FIG. 1.
Figure 4:
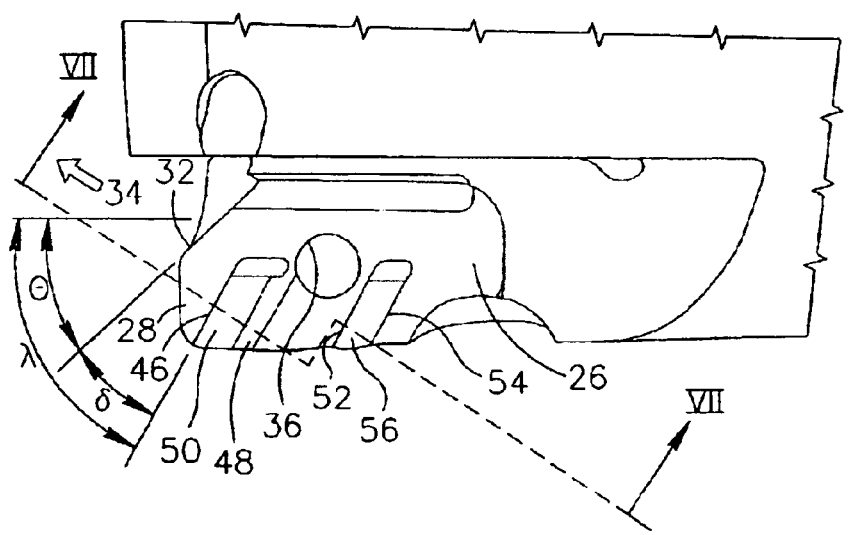
FIG. 4 is a top view of a front portion of the insert holder of FIG. 1.
Figure 5:
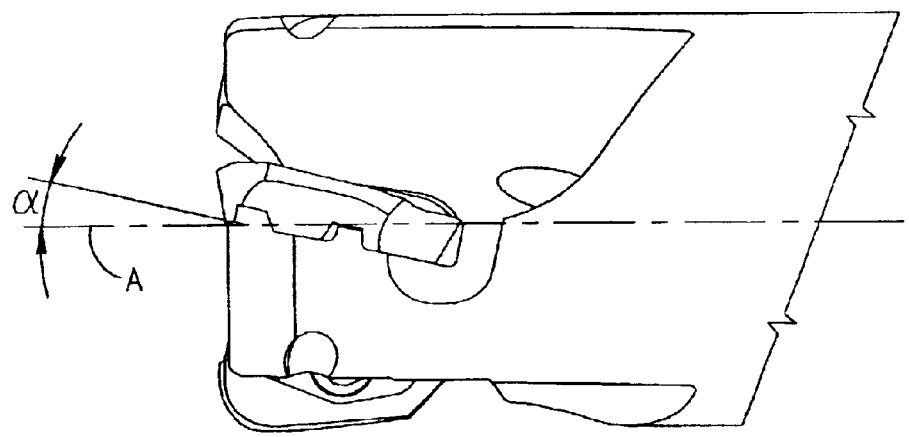
FIG. 5 is a side view of a front portion of the cutting tool of FIG. 1.

Attention is drawn to FIGS. 1 to 12. As shown, a cutting tool 10, having an axis of rotation A, comprises an insert holder 12 and three cutting inserts 14 mounted within equally peripherally distributed insert receiving pockets 16 formed in a front portion of the insert holder 12. Each of the insert receiving pockets is associated with a chip gullet 18 and with a coolant through bore 19. In the described embodiment of the cutting tool 10 three cutting inserts are used. However, it is understood that the invention is equally applicable to any cutting tool using at least one cutting insert. All the cutting inserts 14 and the insert receiving pockets 16 are equal therefore only one of them will be described.

Each of the insert receiving pockets 16 comprises a longitudinally extending inner wall 20 substantially co-directional with the axis of rotation A. An upper portion of the inner wall 20 is flat and constitutes a radial abutment surface 22. The radial abutment surface 22 does not have to be formed from a single flat surface. Rather, it can be formed from two discrete surfaces separated by a groove. In which case, the two discrete surfaces may be flat and coplanar, or, each of them may be convex. A rear wall 24 of the insert receiving pocket 16 is formed adjacent the inner wall 20 and substantially perpendicular thereto. As will be explained below, the rear wall 24 does not constitute an abutment surface.

A lower wall 26 of the insert receiving pocket 16 is connected substantially perpendicularly to the inner wall 20 and to the rear wall 24. The lower wall 24 is flat and constitutes a tangential abutment surface. In a side view of the insert holder 12, the lower wall 26 forms an acute first angle α with the axis of rotation A. A front end 28 of the lower wall 26 is protruding forwardly with respect to a central portion 30 of the insert holder 12 adjacent the axis of rotation A. A forward inner end 32 of the lower wall 26 extends inwardly rearwardly from the front end 28 towards the central portion 30 at an acute second angle θ with respect to the axis of rotation A (shown in FIG. 4 with respect to a line parallel to the axis A). The second angle θ is in the range of 20° to 60°. According to a specific embodiment of the present invention, the second angle θ is 45°. The forward inner end 32 extends generally perpendicularly to a ramp-down direction 34 in which the cutting tool 10 is designed to cut. A threaded bore 36 extends downwardly from the lower wall 26 and is capable of receiving therein a threaded portion of a clamping screw 38.

A front protrusion 40 and a rear protrusion 42, which are integrally formed with the lower wall 26, rise evenly upwardly therefrom. The protrusions 40 and 42 are substantially parallel to each other, extend inwardly and rearwardly from the periphery 44 of the insert holder 12 at an acute third angle δ with respect to the forward inner end 32 and terminate approximately adjacent the sides of the threaded bore 36. The third angle δ is in the range of 0° to 20°. Therefore, the protrusions 40 and 42 extend inwardly and rearwardly at an acute combined fourth angle λ=θ+δ with respect to the axis of rotation A. Hence, the combined fourth angle λ is in the range of 20° to 80°. According to a specific embodiment of the present invention, the fourth angle λ is 60°. The size of the third angle δ depends on two opposite constraints. First, the smaller the first angle δ, the better the support of the cutting insert in the ramp-down direction against radially outwardly directed cutting forces. Second, the larger the third angle δ, the better the axial location precision of the cutting insert in the insert receiving pocket. It is understood that the size of the third angle δ is a design compromise between the two opposite constraints. According to a specific embodiment of the present invention, the third angle δ is 15°.

The front protrusion 40 has a front surface 46, perpendicular to the lower wall 26, a rear surface 48 and a top surface 50 connecting between the front surface 46 and the rear surface 48 and substantially parallel to the lower wall 26. The rear surface 48 forms an external obtuse fifth angle δ with an adjacent portion of the lower wall 26. The rear protrusion 42 has a front surface 52, substantially perpendicular to the lower wall 26, a rear surface 54, substantially perpendicular to the lower wall 26, and a top surface 56 connecting between the front and rear surfaces 52 and 54 and substantially parallel to the lower wall 26.

Figure 6:
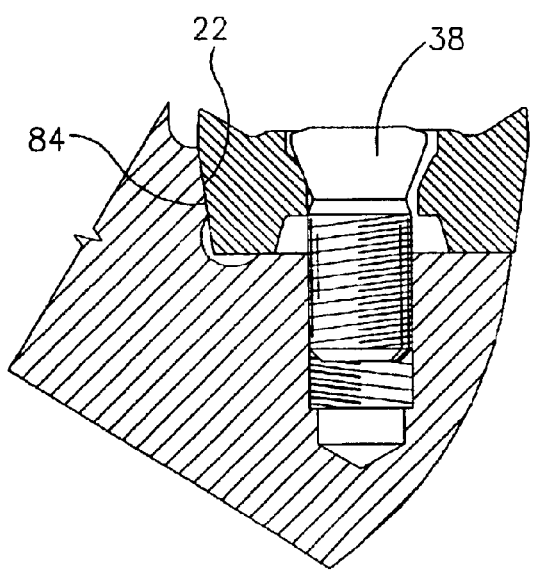
FIG. 6 is a cross-sectional view along line VI—VI in FIG. 3.

The cutting insert 14 comprises a top surface 58, a bottom surface 60 and a side surface 62 extending between the top and bottom surfaces. The intersection between the top surface 58 and the side surface 62 forms cutting edges. Each of the cutting edges is continuously connected to adjacent cutting edges and is associated with a rake surface 63 in the top surface 58. Preferably, all the rake surfaces 63 are positive, and extend continuously around the periphery of the top surface 58. Positive means that the rake surface extends from the cutting edge generally downwardly towards the bottom surface, as seen in FIG. 6. A central through bore 64, having an axis 66, extends perpendicularly between the top surface 58 and the bottom surface 60. The cutting insert 14 has a 180° rotational symmetry about the axis 66. In a top view, the cutting insert has a generally parallelogrammatical shape defining a pair of long cutting edges 68, a pair of short cutting edges 70, transversely directed to and extending from the long cutting edges 68, and a pair of rounded cutting edges 72. Each of the rounded cutting edges 72 extends between a long cutting edge 68 and a short cutting edge 70.

Figure 12:
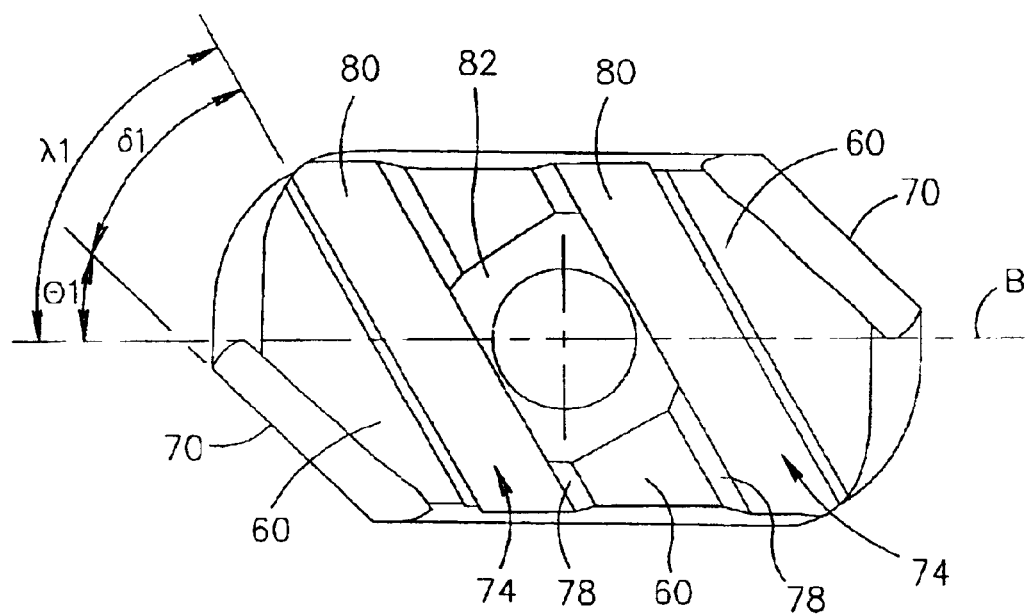
FIG. 12 is a bottom view of the cutting insert of FIG. 8.

The bottom surface 60 of the cutting insert 14 is provided with two identical parallel holder engaging grooves 74 located on opposite sides of the through bore 64. The grooves 74 are oriented generally in the same direction as the short cutting edges 70 and are oriented transversely with respect to a longitudinal axis B of the cutting insert 14. As shown in FIG. 12, the orientation of the short cutting edges 70 the grooves 74 with respect to the longitudinal axis B of the cutting insert 14 generally corresponds to the orientation of the forward inner end 32 of the lower wall 26 and the protrusions 40 and 42 with respect to the axis of rotation A.

The short cutting edges 70 are slanted at an acute sixth angle θ1 with respect to the longitudinal axis B of the cutting insert 14. The sixth angle θ1 is similar to the second angle θ and is in the range of 20° to 60°. According to a specific embodiment of the present invention, the sixth angle θ1 is 45°. The grooves 74 are slanted at an acute seventh angle δ1 with respect to the short cutting edges 70. The seventh angle δ1 is similar to the third angle δ and is in the range of 0° to 20°. According to a specific embodiment of the present invention, the seventh angle δ1 is 15°. The grooves 74 are slanted at an acute combined eighth angle λ1 with respect to the longitudinal axis B. The combined eighth angle λ1 is similar to the combined fourth angle λ and is in the range of 20° to 80°. According to a specific embodiment of the present invention, the eighth angle λ1 is 60°.

The grooves 74 extend between the side surfaces associated with the long cutting edges 68. Each groove 74 has, with respect to the axis 66, a distal side wall 76 that is perpendicular to the bottom surface 60 and a proximal side wall 78 that is slanted with respect to the bottom surface 60 at an internal obtuse ninth angle γ. A top surface 80, substantially parallel to the bottom surface 60, connects between the distal side wall 76 and the proximal side wall 78. The space between the grooves 74 adjacent the through bore 64 forms a cutout 82.

In an assembled position of the cutting insert 14 within an insert receiving pocket 16, the cutting insert 14 is retained by a clamping screw 38 that passes through the through bore 64 and threadingly engages the threaded bore 36. The bottom surface 60 of the cutting insert, constituting a tangential abutment surface, abuts the lower wall 26 of the insert receiving pocket. A side surface 84, constituting a radial abutment surface of the cutting insert, that is associated with the long cutting edge adjacent the inner wall 20 of the insert receiving pocket, abuts the radial abutment surface 22 of the insert receiving pocket. A rear portion 67 of the cutting insert 14 remains un-abutted and is spaced from the rear wall 24 of the insert receiving pocket.

Figure 7:
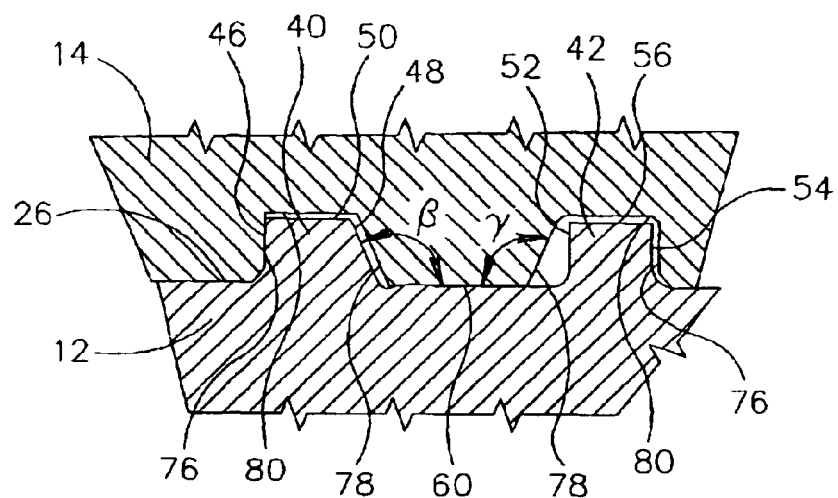
FIG. 7 is a cross-sectional view along line VII—VII in FIG. 4.
Figure 8:
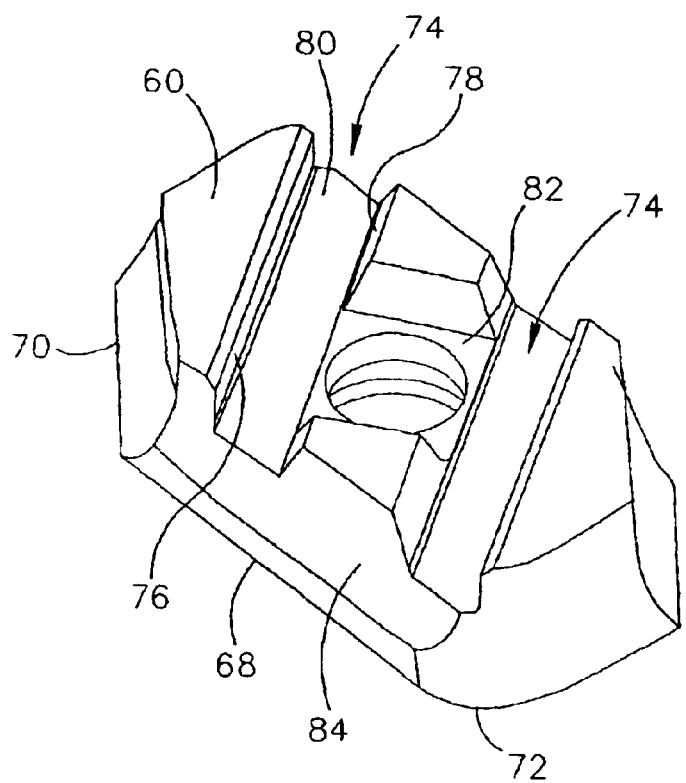
FIG. 8 is a bottom perspective view of the cutting insert of FIG. 1.
Figure 9:
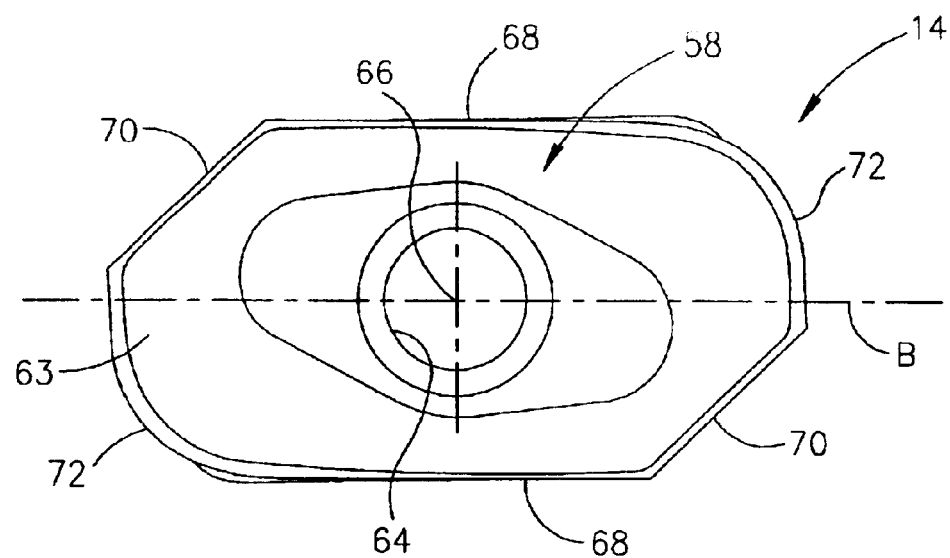
FIG. 9 is a top view of the cutting insert of FIG. 8.
Figure 10:
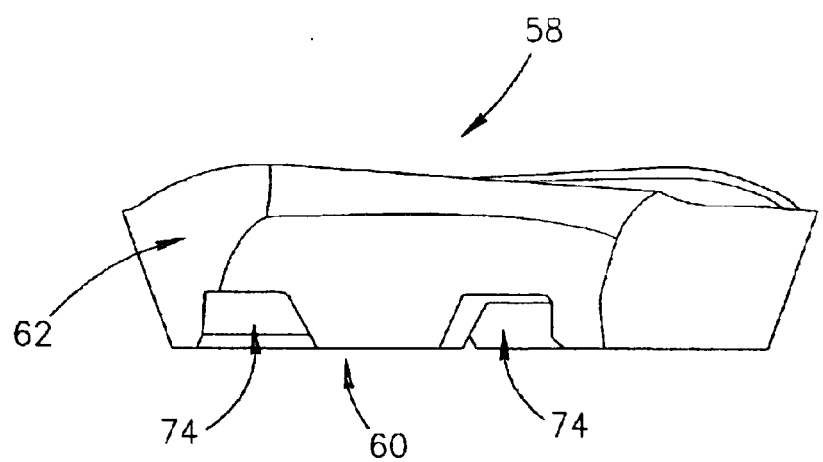
FIG. 10 is a side view of the cutting insert of FIG. 8.
Figure 11:
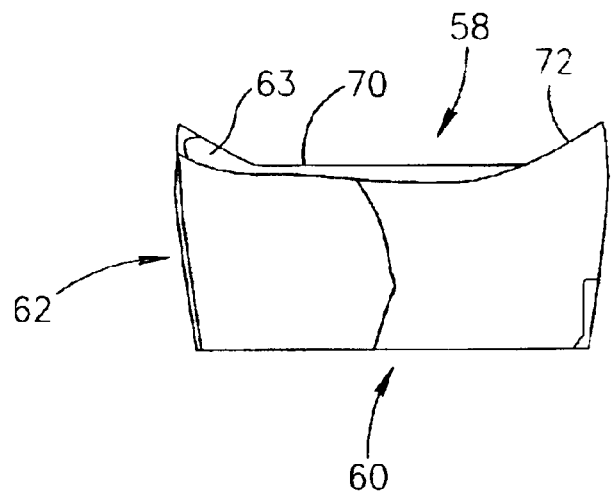
FIG. 11 is a front view of the cutting insert of FIG. 8.

As best seen in FIG. 7, the protrusions 40 and 42 of the insert receiving pocket 16 engage the corresponding grooves 74 in the bottom surface 60 of the cutting insert. However, only one surface of the protrusions 40 and 42 abuts the cutting insert 14. That is, the front surface 46 of the front protrusion 40 abuts a front distal side wall 76 of the front groove 74, namely, the cutting insert is initially supported in the direction of the cutting forces applied thereon during a ramp-down operation. All the other surfaces of the protrusions, namely, the top surface 50, the rear surface 48, the front surface 52, the top surface 56 and the rear surface 54 remain un-abutted.

By way of the above construction, where the front surface 46 of the front protrusion 40 abuts a front distal side wall 76 of the cutting insert 14, it is ensured that, during a ramp-down operation, the cutting insert 14 is well supported against radially outwardly directed forces that tend to push the cutting insert out of the insert receiving pocket. Furthermore, since the cutting insert is already initially supported in the direction of the cutting forces applied thereon during a ramp-down operation, there is actually no bending moment acting on the clamping screw 38 and the cutting insert remains in its initially location during the cutting operation, presenting a zero clearance, thereby providing good repeatability and good surface quality. Since the front surface 46 of the front protrusion 40 is located relatively close to the front end 28 and to the forward inner end 32 of the lower wall 26, it is ensured that the radially outwardly directed moments applied on the cutting insert during ramp-down operations are reduced to a minimum.

In the embodiment described, the long cutting edges 68 constitute side cutting edges of the cutting tool 10, the short cutting edges 70 constitute internal cutting edges and the rounded cutting edges 72 constitute front cutting edges. When the operative cutting edges are worn, the clamping screw 38 is loosened and the cutting insert 14 is rotated by 180° around the axis 66 to bring fresh cutting edges into operative position.

As already mentioned, when the cutting insert 14 is retained within the insert receiving pocket 16, the rear protrusion 42 does not abut any surface within the rear groove 74. The function of the rear protrusion 42 is to prevent the produced chips from entering into the rear groove 74 so that when the cutting insert is indexed and rotated and the former rear groove 74 becomes a forward and operative groove, the groove will be free from chips and undamaged so that the distal side wall 76 of the groove could properly abut the front surface 46 of the front protrusion 40.

Preferably, in order to accurately and repeatedly locate the cutting insert 14 within the insert receiving pocket 16, the radial abutment surface 84, the bottom surface 60 and the grooves 74 are ground.

Although the present invention has been described to a certain degree of particularity, it should be understood that various alterations and modifications could be made without departing from the spirit or scope of the invention as hereinafter claimed.

What is claimed is:

1. A cutting tool, having an axis of rotation (A), comprising an insert holder and at least one cutting insert mounted therein in a respective insert receiving pocket formed in a front portion of the insert holder;

the insert receiving pocket comprising a longitudinally extending inner wall substantially co-directional with the axis of rotation (A) of the cutting tool, at least a portion of the inner wall constitutes a radial abutment surface of the insert receiving pocket, a rear wall adjacent the inner wall and substantially perpendicular thereto, a lower wall adjacent the inner wall and the rear wall and substantially perpendicular thereto, a front end of the lower wall protruding forwardly with respect to a central portion of the insert holder adjacent the axis of rotation (A) of the cutting tool, a threaded bore extending downwardly from the lower wall, a rear protrusion rising upwardly from the lower wall and a front protrusion rising upwardly from the lower wall and extending inwardly and rearwardly from periphery of the insert holder, the front protrusion has a front surface perpendicular to the lower wall of the insert receiving pocket, a rear surface and a top surface connecting between the front surface and the rear surface;

the at least one cutting insert comprises an insert top surface, a bottom surface and a side surface extending between the insert top surface and the bottom surface, a central through bore having an axis extending between the insert top surface and the bottom surface, two holder engaging grooves formed in the bottom surface, each holder engaging groove having a distal side wall distal from the axis of the through bore and perpendicular to the bottom surface, a proximal side wall proximal to the axis of the through bore and a groove top surface connecting between the distal side wall and the proximal side wall;

in an assembled position of the at least one cutting insert within the respective insert receiving pocket the at least one cutting insert is retained by a clamping screw that passes through the through bore and threadingly engages the threaded bore, the bottom surface of the at least one cutting insert abuts the lower wall of the insert receiving pocket, a radial abutment surface formed in the side surface of the at least one cutting insert adjacent the inner wall of the insert receiving pocket abuts the radial abutment surface of the insert receiving pocket, the front surface of the front protrusion abuts the front distal side wall of one of the holder engaging grooves and a rear portion of the at least one cutting insert is spaced from the rear wall of the insert receiving pocket.

2. The cutting tool according to claim 1, wherein the front protrusion is integrally formed with the lower wall of the insert receiving pocket.

3. The cutting tool according to claim 1, wherein the front protrusion terminates adjacent the threaded bore.

4. The cutting tool according to claim 1, wherein a forward inner end of the lower wall extends inwardly rearwardly from the front end towards the central portion at an acute second angle ($\theta$) with respect to the axis of rotation (A), the second angle ($\theta$) being in the range of 20° to 60°.

5. The cutting tool according to claim 4, wherein the second angle ($\theta$) is 45°.

6. The cutting tool according to claim 4, wherein the front protrusion extends inwardly and rearwardly from the periphery of the insert holder at an acute third angle ($\delta$) with respect to the forward inner end of the lower wall, the third angle ($\delta$) being in the range of 0° to 20°.

7. The cutting tool according to claim 6, wherein the third angle ($\delta$) is 15°.

8. The cutting tool according to claim 6, wherein the front protrusion extends inwardly and rearwardly from the periphery of the insert holder at an acute combined fourth angle ($\lambda$) with respect to the axis of rotation (A), the fourth angle ($\lambda$) being in the range of 20° to 80°.

9. The cutting tool according to claim 8, wherein the fourth angle ($\lambda$) is 60°.

10. The cutting tool according to claim 1, wherein the rear surface of the front protrusion forms an external obtuse angle ($\beta$) with an adjacent portion of the lower wall of the insert receiving pocket.

11. The cutting tool according to claim 1, wherein the rear protrusion extends parallel to the front protrusion.

12. The cutting tool according to claim 11, wherein the rear protrusion has a front surface substantially perpendicular to the lower wall of the insert receiving pocket, a rear surface substantially perpendicular to the lower wall of the insert receiving pocket, and a top surface connecting between the front and rear surfaces of the rear protrusion and substantially parallel to the lower wall of the insert receiving pocket.

13. The cutting tool according to claim 11, wherein the front protrusion and the rear protrusion rise evenly upwardly from the lower wall of the insert receiving pocket.

14. The cutting tool according to claim 1, wherein an upper portion of the inner wall of the insert receiving pocket is flat and constitutes the radial abutment surface.

15. The cutting tool according to claim 1, wherein an intersection between the insert top surface and the side surface of the at least one cutting insert defines cutting edges, each of the cutting edges is continuously connected to adjacent cutting edges.

16. The cutting tool according to claim 11, wherein each of the cutting edges is associated with a rake surface, the rake surfaces are positive and extend continuously all around the periphery of the insert top surface.

17. The cutting tool according to claim 1, wherein through bore is perpendicular to the insert top surface and the bottom surface of the at least one cutting insert.

18. The cutting tool according to claim 1, wherein the at least one cutting insert has a 180° rotational symmetry about the axis of the through bore.

19. The cutting tool according to claim 1, wherein in a top view the at least one cutting insert has a generally parallelogrammatical shape defining a pair of long cutting edges, a pair of short cutting edges, transversely directed to and extending from the long cutting edges, and a pair of rounded cutting edges, each of the rounded cutting edges extends between a long cutting edge and a short cutting edge.

20. The cutting tool according to claim 1, wherein the two holder engaging grooves are identical, parallel and symmetrically disposed with respect to the axis of the through bore.

21. The cutting tool according to claim 1, wherein the proximal side wall of each holder engaging groove is slanted at an internal obtuse ninth angle ($\gamma$) with respect to the bottom surface of the at least one cutting insert.

22. A cutting insert comprising an insert top surface, a bottom surface and a side surface extending between the top and bottom surfaces, a central through bore having an axis extending between the insert top surface and the bottom surface, the bottom surface being provided with exactly two identical parallel holder engaging grooves located on opposite sides of the through bore, the two holder engaging grooves being oriented transversely with respect to a longitudinal axis (B) of the cutting insert, each of the two holder engaging grooves has a distal side wall distal from the axis of the through bore and perpendicular to the bottom surface of the at least one cutting insert, a proximal side wall proximal to the axis of the through bore and a groove top surface connecting between the distal side wall and the proximal side wall.

23. The cutting insert according to claim 22, wherein each of the proximal side walls is slanted at an internal obtuse ninth angle ($\gamma$) with respect to the bottom surface of the cutting insert.

24. The cutting insert according to claim 22, wherein an intersection between the insert top surface and the side surface of the cutting insert defines cutting edges, each of the cutting edges is continuously connected to adjacent cutting edges.

25. The cutting insert according to claim 24, wherein each of the cutting edges is associated with a rake surface, the rake surfaces are positive and extend continuously all around the periphery of the insert top surface.

26. The cutting insert according to claim 22, wherein the through bore is perpendicular to the insert top surface and the bottom surface of the cutting insert.

27. The cutting insert according to claim 22, wherein the cutting insert has a 180° rotational symmetry about the axis of the through bore.

28. The cutting insert according to claim 22, wherein in a top view the cutting insert has a generally parallelogrammatical shape defining a pair of long cutting edges, a pair of short cutting edges, transversely directed to and extending from the long cutting edges, and a pair of rounded cutting edges, each of the rounded cutting edges extends between a long cutting edge and a short cutting edge.

29. The cutting insert according to claim 28, wherein the short cutting edges are slanted at an acute sixth angle ($\theta 1$) with respect to the longitudinal axis (B) of the cutting insert, the sixth angle ($\theta 1$) being in the range of 20° to 60°.

30. The cutting insert according to claim 29, wherein the sixth angle ($\theta 1$) is 45°.

31. The cutting insert according to claim 28, wherein the two holder engaging grooves are slanted at an acute seventh angle (δ1) with respect to the short cutting edges, the seventh angle (δ1) being in the range of 0° to 20°.

32. The cutting insert according to claim 31, wherein the seventh angle (δ1) is 15°.

33. The cutting insert according to claim 28, wherein the two holder engaging grooves are slanted at an acute combined eighth angle (λ1) with respect to the longitudinal axis (B) of the cutting insert, the eighth angle (λ1) being in the range of 20° to 80°.

34. The cutting insert according to claim 33, wherein the eighth angle (λ1) is 60°.

35. A cutting insert comprising an insert top surface, a bottom surface and a side surface extending between the insert top surface and the bottom surface, a central through bore having an axis extending between the insert top surface and the bottom surface, the bottom surface being provided with an even number of holder engaging grooves, the holder engaging grooves being parallel to one another, located on opposite sides of the through bore, and oriented transversely with respect to a longitudinal axis (B) of the cutting insert, each of the holder engaging grooves having a distal side wall distal from the axis of the through bore and perpendicular to the bottom surface of the at least one cutting insert, a proximal side wall proximal to the axis of the through bore and a groove top surface connecting between the distal side wall and the proximal side wall.

36. The cutting insert according to claim 35, wherein the bottom surface is provided with a total of two such holder engaging grooves.

37. A cutting tool, having an axis of rotation (A), comprising:

an insert holder having at least one insert receiving pocket formed in a front portion of the insert holder, the insert receiving pocket comprising:
  a longitudinally extending inner wall extending along the axis of rotation (A);
  a rear wall adjacent the inner wall;
  a lower wall adjacent the inner wall and the rear wall;
  a threaded bore extending downwardly from the lower wall;
  a rear protrusion rising upwardly from the lower wall, the rear protrusion having a front surface, a rear surface and a top surface connecting between the front surface and the rear surface;
  a front protrusion rising upwardly from the lower wall, the front protrusion having a front surface, a rear surface and a top surface connecting between the front surface and the rear surface; and at least one cutting insert mounted in the insert receiving pocket, at least one cutting insert comprising:
  an insert top surface, a bottom surface and a side surface extending between the insert top surface and the bottom surface;
  a central through bore having an axis extending between the insert top surface and the bottom surface;
  an even number of holder engaging grooves formed on the bottom surface, the holder engaging grooves being identical, parallel to one another, located on opposite sides of the through bore, and oriented transversely with respect to a longitudinal axis (B) of the cutting insert, each of the holder engaging grooves having a distal side wall distal from an axis of the through bore and perpendicular to the bottom surface, a proximal side wall proximal to the axis of the through bore and a groove top surface connecting between the distal side wall and the proximal side wall;

wherein in an assembled position of the at least one cutting insert within the insert receiving pocket:
  the at least one cutting insert is retained by a clamping screw that passes through the through bore and threadingly engages the threaded bore;
  a radial abutment formed in the side surface of the at least one cutting insert adjacent the inner wall of the insert receiving pocket abuts a radial abutment surface of the insert receiving pocket;
  the front surface of front protrusion abuts the front distal side wall of one of the holder engaging grooves,
  the rear surface of the front protrusion, and the front rear surfaces of the rear protrusion remain un-abutted by side walls of the holder engaging grooves; and
  a rear portion of the at least one cutting insert is space from the rear wall of the insert receiving pocket.

38. The cutting tool according to claim 37, wherein the bottom surface of the cutting insert is provided with a total of two such holder engaging grooves.

39. The cutting tool according to claim 37, wherein the front surface of the front protrusion is perpendicular to the lower wall of the insert receiving pocket.

40. The cutting tool according to claim 37, wherein the front protrusion extends inwardly and rearwardly from a periphery of the insert holder.

* * * * *